(12) United States Patent
Stapleton et al.

(10) Patent No.: US 6,175,875 B1
(45) Date of Patent: Jan. 16, 2001

(54) MULTICAST FILTERING

(75) Inventors: Nicholas Stapleton, Uxbridge (GB); Tadhg Creedon, Galway (IE); David Law, Kempston; Peter Wilson, Welwyn Garden, both of (GB)

(73) Assignee: 3Com Technologies, Grand Cayman (KY)

( * ) Notice: Under 35 U.S.C. 154(b), the term of this patent shall be extended for 0 days.

(21) Appl. No.: 09/032,341

(22) Filed: Feb. 27, 1998

(30) Foreign Application Priority Data

Feb. 27, 1997 (GB) .................................................. 9704060

(51) Int. Cl.$^7$ ...................................................... G06F 13/00
(52) U.S. Cl. ........................ 709/250; 370/246; 370/274; 370/392; 370/432
(58) Field of Search ..................................... 709/204, 218, 709/229, 250; 370/246, 260, 389, 392, 432, 274

(56) References Cited

U.S. PATENT DOCUMENTS

| | | | |
|---|---|---|---|
| 5,161,192 | 11/1992 | Carter et al. | 380/48 |
| 5,177,788 * | 1/1993 | Schanning | 713/162 |
| 5,305,385 | 4/1994 | Schanning et al. | 380/49 |
| 5,414,694 * | 5/1995 | Crayford et al. | 370/246 |
| 5,469,438 * | 11/1995 | Baumert et al. | 370/432 |
| 5,559,883 | 9/1996 | Williams | 380/4 |
| 5,568,476 * | 10/1996 | Sherer | 370/236 |
| 5,590,201 * | 12/1996 | Lo | 370/257 |
| 5,870,566 * | 2/1999 | Joh | 709/251 |

FOREIGN PATENT DOCUMENTS

| | | |
|---|---|---|
| 0 255 767 A2 | 2/1988 | (EP) . |
| 0 431 751 A1 | 6/1991 | (EP) . |
| 0 668 680 A1 | 8/1995 | (EP) . |
| 2 256 564 | 12/1992 | (GB) . |
| WO 96/21299 | 7/1996 | (WO) . |
| WO 96/21300 | 7/1996 | (WO) . |
| WO 96/29796 | 9/1996 | (WO) . |
| WO 96/38949 | 12/1996 | (WO) . |

* cited by examiner

*Primary Examiner*—Moustafa M. Meky
(74) *Attorney, Agent, or Firm*—Wilson Sonsini Goodrich & Rosati

(57) ABSTRACT

A repeater for a computer network, and a network incorporating such a repeater are described in which repeater communication addressed to a subset of the devices connected to the repeater are transmitted in a corrupt or scrambled form to other network devices. The processing load is thus reduced for such other network devices, in particular in the context of high volume multicast traffic such as in video conferencing.

4 Claims, 2 Drawing Sheets

MULTICAST FILTERING

FIELD OF THE INVENTION

The present invention relates to communications in a local area network (LAN) and has particular application to the transmission of multicast communications or other high volume traffic through the network.

BACKGROUND OF THE INVENTION

As is well known, a computer network such as a LAN comprises a plurality of end stations, such as computers, file servers and printers. To enable the end stations to communicate with each other a shared communication medium is provided typically by connecting the end stations to ports on communication nodes. Communications are sent across the network by way of packets, which each comprise at least the destination address of the packet, its source address, the data which is desired to be communicated and some additional data enabling an error check to be made at the destination to determine if the packet has been corrupted during transmission. When an end station wishes to send a communication packet, it determines whether the communication medium to which it is connected is currently busy and, if not, it transmits its packet. The communications packet is therefore received by a communication node which retransmits the packet to one or more of its other ports according to the construction of the node.

Various types of communication node are known, in particular we will mention here a repeater and a bridge. In simple terms, a repeater simply retransmits a packet received on any one port to each of its other ports. This ensures that any packet put onto any portion of the communication medium to which the repeater is connected appears on the rest of the communication medium. In this way, the transmitted packet is received by all of the other end stations, including the intended destination.

One particular type of bridge is known from U.S. Pat. No. 5,161,192 (Carter et al). This repeater provides a security function of assessing if each communication passing through it is "permitted", and corrupting the communication during retransmission if it is not permitted.

Another type of communications node is known as a bridge. On receiving a communications packet on one of its ports, a bridge determines the intended destination of the packet and retransmits it only on the port or ports necessary to ensure that the packet in question reaches its intended destination or destinations. The use of a bridge instead of a repeater therefore ensures that portions of the communications medium which are not required for a particular transmission do not receive that transmission and therefore reduces network congestion on such portions and traffic load on end-stations on those portions. Also, a bridge enables more than one transmission to occur at any one time, thereby improving network bandwidth. However, a bridge is disadvantageous compared to a repeater in that it has a higher latency, that is it does not retransmit received communications as quickly as does a repeater, and also, due to its increased complexity and required processing power, it is considerably more expensive for a device providing comparable transmission speeds.

By way of example, the cost of a bridge which can handle communications at speeds of 10 mbps (mega-bits per second) is broadly the same as the cost of a repeater which can handle communications at speeds of 100 mbps. This is because, as mentioned, the bridge must have additional processing power in order to perform its function, and also it is the case that the internal bus in a 10 mbps bridge may in fact have to be capable of handling communications at a rate at least ten times higher than this in order to cope with the potential multiplicity of communications occurring at the same time through a bridge In many network situations it is in fact more efficient to connect all of the end stations together simply using repeaters operating at high speeds as opposed to using bridges which may be operating at lower speeds. This is because the whole band width provided by the high speed repeaters is then available to be divided between however many communications are occurring, thus maximising the bandwidth for each communication.

An end station is typically connected to a network via a media access control (MAC) device which handles the interface onto the network One of the functions of the MAC device is to assess whether, on receipt of a communications packet, it has been corrupted during transmission from its source. In many implementations, if the packet has been corrupted then the MAC device simply ignores the received packet and does not pass it to its end station.

There are a number of types of communication which may occur in a computer network as described above. Firstly, the simplest form of communication is a unicast communication, which is a communication sent out by one end station and intended to be received by only one end station Therefore the destination address in this communication packet will uniquely identify the desired destination end station and will be recognised and received by the MAC device of that end station. Due to the action of the repeaters in a network, the unicast communications packet will also be received by a number of other end stations for which the communication is not intended ("non-intended destinations"). The MAC device of such a non-intended destination will recognise that the packet in question is a unicast communication which is not intended for itself and will therefore ignore the packet and in particular will not pass it to its end station. In this way, unicast communications are processed only by the end Station for which they are intended.

Secondly, there are broadcast communications, which are sent out by a single end station but which are intended to be received by every other end station connected to the network. On receiving such a communication, a MAC device will assuming the packet has been received not corrupted, pass the packet on for processing by its end station.

Thirdly, there are communications known as multicast communications. These are communications sent out by a particular end station and are intended to be received by a selected plurality of other end stations. On receiving a multicast packet, a MAC device in many implementations cannot itself be determine whether it is an intended destination of the communication and must therefore, if the packet is uncorrupted, pass the received multicast packet to its associated end station for processing. If, on processing the packet, the end station concludes that the packet in question was not intended for it, it simply ignores it, but it has had to spend a certain amount of resources in processing the packet in the first place.

This means that all of the end stations in the network must have sufficient processing power to process and consider all of the multicast communications sent in the network. So long as there is not a high volume of multicast traffic on the network this does not cause particular problems and networks have been functioning in this way for some time.

However, with recent advances in video conferencing, video-on-demand and other technologies, the potential volume of multicast traffic on a computer network has considerably increased In a video conference between three or more end stations on a network, each of those end stations will be sending multicast communications intended to be received by the other end stations in the video conference and, due to the nature of video communication, this will generate a very high volume of multicast communication. Clearly, the end stations involved in the video conference will be designed to receive and process this high volume of multicast traffic. However, other end stations connected to the network which, in the above described scheme of operation, will all receive and have to process all of the multicast communications, may not have sufficient processing power to process and discard all of the multicast communications, and still be able to process their own communications via the network.

For this reason, it is desired to have a communications node for use in a network as described above which enables a high volume of multicast communications to occur within the network without necessitating an increase in the processing power available at end stations on the network which are not part of the multicast communications.

SUMMARY OF THE INVENTION

The present invention provides a repeater for use in a computer network for providing communication between a plurality of network devices connected to the repeater, in which network communication is conducted by way of data frames of preset format, the repeater comprising;

a plurality of ports to which network devices may be connected;

means for receiving incoming data frames to any one of said ports and for retransmitting them via the other ports during a time interval that begins before the complete data frame has been received;

means for storing information identifying a class of communication which occurs between network devices attached to a subset of said ports, said subset comprising at least three ports;

means for reading at least a portion of a received data fame and determining whether that frame falls within said class of communication; and means for corrupting, if the result of said determining is positive, the frame in retransmission via ports other than those in said subset.

The invention thus provides a repeater, which, on receipt of a multicast communication packet, retransmits the packet on those of its ports necessary to ensure that the packet reaches its intended destinations, and on its other ports transmits a corrupt or scrambled data packet. In this context, a corrupt or scrambled data packet simply means a data packet which will appear to a MAC device as one which has been corrupted during transmission.

The present invention also provides a computer network comprising a plurality of network devices and a repeater, the repeater comprising a plurality of ports, each network device being connected to one of said ports, the network devices being arranged to transmit and receive data frames of preset format and comprising means for determining if a received data frame is corrupt and for inhibiting further processing of a received data frame determined to be corrupt, wherein the repeater comprises;

means for receiving incoming data frames to any one of said ports and for retransmitting them via the other ports during a time interval that begins before the complete data frame has been received;

means for storing information identifying a class of communication which occurs between a subset of said network devices;

means for reading at least a portion of a received data frame and determining whether that frame falls within said class of communication;

means for corrupting, if the result of said determining is positive, the frame in retransmission via ports other than those in said subset;

whereby network devices not within said subset receive only corrupt forms of frames which fall within said class of communication and do not perform said further processing of such frames.

In this context, a network device may be an end station as discussed above, or may be another communication mode having onward connections therefrom.

In a network as defined above the MAC devices of the end stations which are involved in a multicast communication receive the communications packets uncorrupted and therefore pass them to their end stations for processing. However, a MAC device associated with an end station which is not involved in the multicast communication receives corrupted data packets which it therefore does not pass on to its associated end station. This means that, despite the large increase in the volume of multicast traffic on the network, the end stations which are not involved in the high volume multicast communications do not themselves have to receive and process this large number of communications.

This invention therefore provides considerable advantages in terms of enabling high volume multicast communications to occur on a network where perhaps not all of the end stations are able to cope with such high volume traffic.

Also a load reduction on end-stations and onward-connected network links is achieved to a similar degree as is achievable with a bridge, at the lower cost of a repeater, in the presence of high volumes of multicast traffic.

It may be the case that similar mechanisms for corrupting the data frames are used in the present invention as are disclosed in U.S. Pat. No. 5,161,192. However, in the present invention the frames are corrupted only for transmission via related ports.

BRIEF DESCRIPTION OF THE DRAWINGS

In order that the present invention will be better understood, an embodiment will be described, by way of example, in the following with reference to the accompanying drawings, in which.

In broad terms a repeater for a computer network, and a network incorporating such a repeater are described in which repeater communication addressed to a subset of the devices connected to the repeater are transmitted in a corrupt or scrambled form to other network devices. The processing load is thus reduced for such other network devices, in particular in the context of high volume multicast traffic such as in video conferencing.

DETAILED DESCRIPTION

Figure 1:
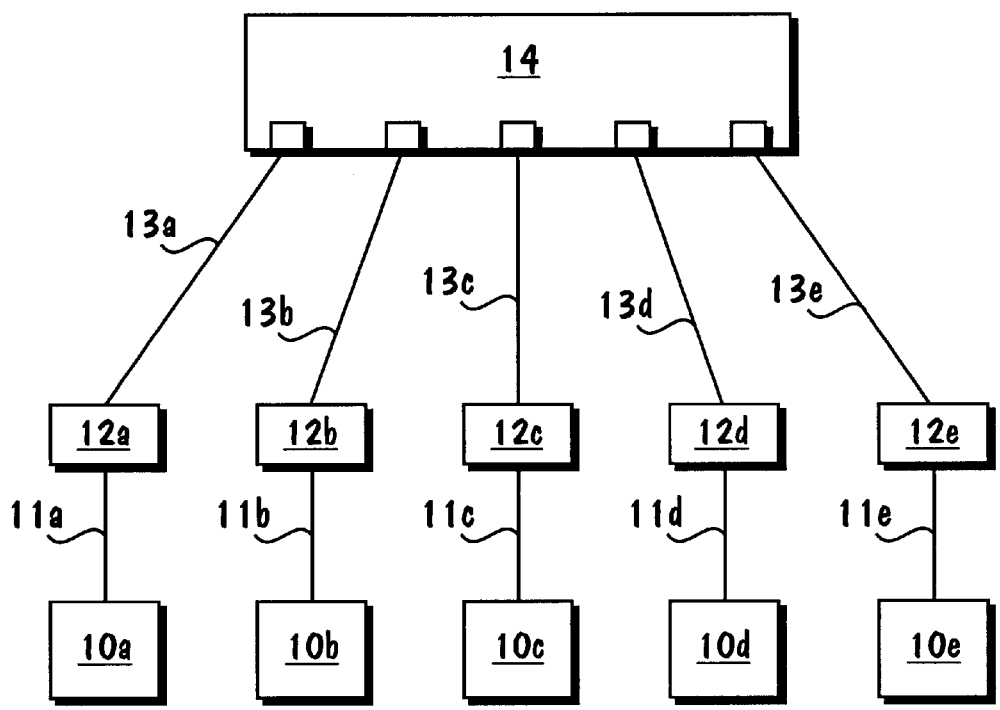
FIG. 1 illustrates in schematic form a simple local area network configuration.

FIG. 1 illustrates in schematic form a simple local area network which is arranged to interconnect and to provide communication between end stations 10a . . . 10e. The network illustrated in FIG. 1 is a highly simplified example of a local area network but is sufficient to explain the operation of the present invention. The application of the present invention to more complex networks will be apparent to those skilled in the art following the discussion given below. Each of end stations 10a . . . 10e is connected via a respective link 11a . . . 11e to a respective MAC device 12a . . . 12e. Each MAC device 12a . . . 12c is connected via a respective network link 13a . . . 13e to a respective port on repeater 14. Such connections are entirely conventional for establishing a network enabling communication between the end stations 10a . . . 10e. Communications between the end stations are made by way of communications packets which are sent by the MAC devices 12a . . . 12e via network links 13a . . . 13e.

Figure 2:
FIG. 2 illustrates the configuration of a communication packet.

The communications packets are strings of digital bits which conform to specified protocols whereby different portions of a communications packet signify different things. FIG. 2 illustrates in schematic form a typical communications packet and shows the portions of such a communications packet which are important for an understanding of the present invention. Particular protocols may specify the presence of additional portions of a communications packet but these are not necessary for an understanding of the present invention. As illustrated in FIG. 2 each communications packet includes an identification of the originator of the communications packet, that is the source address (SA). Also, the communications packet includes an identification of the intended destination of the communications packet, that is the destination address (DA) At the heart of the communications packet is the data which is intended to be passed in the communication and finally a number of check digits are included to enable a check to be made on receipt of a communications packet of whether the data in the packet has been corrupted during transmission.

When a communications packet is transmitted from any of end stations 10a . . . 10c via the respective MAC device 12a . . . 12e it is received at the respective port of repeater 14 via the respective network link 13a . . . 13e. As is well known, a conventional repeater 14 acts simply to retransmit the received communications packet on each of its other ports such that each of the others of MAC devices 12a . . . 12e receives the communications packet and therefore among the recipients of the communications packet is the intended destination.

In more detail, consider a situation where end station 10a wishes to transmit a communications packet to end station 10d. The communications packet will be transmitted by MAC device 12a via link 13a and the source address in the communications packet will identify station 10a as the source of the packet while the destination address will identify end station 10d as the intended destination. On receipt of the communications packet via link 13a, repeater 14 retransmits the communications packet on each of links 13b . . . 13e. The communications packet is therefore received by each of MAC devices 12b . . . 12e. Each of these MAC devices firstly assesses, on the basis of the received check digits, whether the communications packet has been received in an uncorrupted state. Assuming that it has been received in an uncorrupted state, each of MAC devices 12b . . . 12e considers the destination address in the communications packet Each of MAC devices 12b, 12c and 12e then discards the received communications packet as it is not intended for receipt by any of the corresponding end stations 10b, 10c and 10e. These three end stations therefore do not receive the communications packet and do not have to process it.

MAC device 12d, on receipt of the communications packet, establishes on the basis of the destination address that the communications packet is intended for receipt by its respective end station 10d. It therefore passes the communications packet to end station 10d via link 11d and the desired communication has taken place.

As mentioned previously, a communication of the type just described in detail is known as a unicast communication. In a typical implementation of a MAC device, it is only unicast communications which can be filtered out by the MAC device, and therefore multicast communications are handled in a different manner, as described in the following.

Consider the situation where multicast communications are intended to occur between end stations 10b, 10d and 10e. Such might be the case where these stations are involved in a video conference for instance. In this situation, each communications packet transmitted by the respective MAC devices 12b, 12d and 12e as part of the multicast communication will, in the destination address portion of the communications packet, include a specific form of address which indicates that the packet is a multicast packet intended to be received by the other two end stations involved in the multicast communications. In the case where such a communications packet is transmitted by MAC device 12b via link 13b to repeater 14 it will, in the normal course of events as described above, be received by each of MAC devices 12a, 12c, 12d and 12e. Assuming that the packets are all received uncorrupted, each of these MAC devices will then consider the destination address. Because the destination address is a multicast address, the MAC devices are not able to decide whether the packet is intended for receipt by the corresponding end stations. Therefore the multicast communication packet originally transmitted by end station 10b will be passed by the respective MAC devices to each of end stations 10a, 10c, 10d and 10e. This is of course entirely appropriate in the case of end stations 10d and 10e as these two end stations are involved in the multicast communication and are intended recipients of the packet.

However, end stations 10a and 10c are not part of the multicast communication which has occurred, but they still have to process the received packet themselves at least to the extent necessary to decide that they should dispose of the packet. This, as will be seen from a comparison with the unicast communication discussed above, represents an increased amount of processing by the end station for a communications packet received by a MAC device which is not intended to be received by the particular end station. In previous situations where there was a relatively low level of multicast traffic occurring on a typical network this increase in processor requirements was not a particular problem as multicast communication formed only a small proportion of the total traffic on the network.

As mentioned above, there are now multicast communication situations which actually generate a significant volume of traffic on the network. If the above discussed multicast communication is one such which provides a great deal of traffic on the network, this involves end stations 10a and 10c in a considerable amount of processing of packets which are not actually intended to be received by them. This is at least an unnecessary waste of resources in end stations 10a and 10c and at worst it may cause these end stations not to be able to process their own communications at all.

The present invention overcomes this problem by altering the operation of repeater 14. Therefore the logistical, and possibly cost problems which may be involved in reconfiguring all the MAC devices in a network to cope directly with multicast are avoided.

The operation of a repeater 14 in accordance with the present invention will be described in conjunction with FIG. 3.

Figure 3:
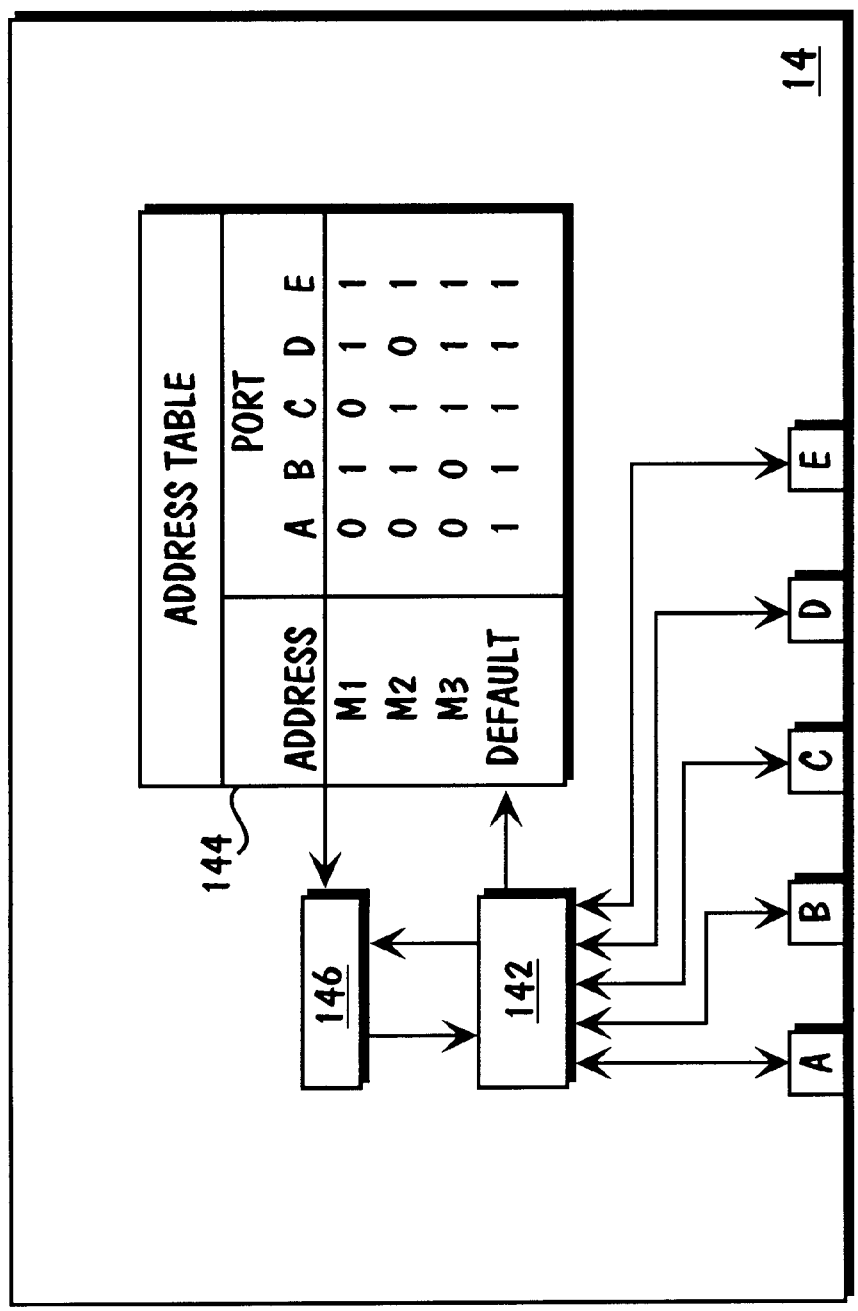
FIG. 3 illustrates the operation of a repeater in the preferred embodiment of this invention.

FIG. 3 shows a repeater 14 having five ports designated A to E. Each of these ports A to E is connected to repeater core 142 which provides the basic repeater functions as described above including retransmitting any received communications packet on the ports other than that which it was received. Repeater 14 in FIG. 3 further comprises means storing an address table 144 which defines the basic operation of the repeater in accordance with the present invention and this is therefore discussed in detail in the following.

The function of address table 144 is to define the operation of repeater 14 on receipt of multicast communications in accordance with the present invention. The table stores details of any desired number of multicast communication addresses and relates each stored address to the desired action in respect of each of repeater ports to A to E. In FIG. 3, the embodiment shown stores the details of three possible multicast addresses, designated M1, M2 and M3. In this embodiment, the required operation in respect of each port is stored as a bit mask as this is a particularly convenient way of storing the information, but it is possible in this invention to store the required information in any appropriate way.

In the bit mask illustrated it is the case that, for each stored multicast address, a "1" designates a port which is involved in the multicast communication, while a "0" bit designates a port which is not involved. It will be seen therefore that multicast address M1 in FIG. 3 designates multicast communications which are occurring between the end stations attached to ports B, D and E and therefore corresponds to the multicast communication discussed above in some detail with relation to FIG. 1. Multicast address M2 designates multicast communications occurring between the end stations attached to ports B, C and E while M3 designates multicast communications between end stations on ports C, D and E.

On receipt of a communications packet, repeater core 142 reads the destination address from the packet and retrieves the corresponding bit mask from address table 144. Scrambling mechanism 146 functions on the basis of the bit mask supplied by table 144 and in conjunction with repeater core 142 to cause the desired operation of the repeater. In particular, the received communications packet will be retransmitted in the received form on those ports which, in the retrieved bit mask, have a "1" entry. For those ports which have a "0" entry in the bit mask a scrambled communications packet is transmitted.

In this context it is to be noted that the term "scrambled" does not necessarily imply any particular encryption. Rather, as described above it is simply requiring that the transmitted communications packet should be in a form where it is deemed to have been corrupted by any MAC device receiving the packet. This could be achieved in any number of ways for instance by filling the data portion of the communications packet with random data, filling the data portion of the communications packet with predefined cyclic or constant data, or merely corrupting the check portion of the communications packet.

It will be seen therefore that when a communications packet is received having a destination address M1 the communications packet is retransmitted in an uncorrupted form on ports B, D and E while a corrupted or scrambled communications packet is transmitted on ports A and C.

Therefore it is the case that any MAC devices attached to ports A and C will discard the received packet and not pass it to their corresponding end stations for processing. This is of course entirely. appropriate as these end stations are not defined as being included in multicast communication M1.

Address table 144 also includes a default bit mask which also has a "1" in each of the port positions. The effect of this is that any communications packet which has a destination address other than M1, M2 or M3 will be retransmitted uncorrupted on all of the other ports. Thus, in this embodiment, any unicast communications, any broadcast communications and any other multicast communications other than those defined by addresses M1, M2 or M3 will be handled in accordance with the normal operation of a repeater and will reach their intended destinations in the usual way.

As mentioned above, this invention is particularly appropriate for dealing with multicast communications of the type involved in video conferencing which transmit a particularly high volume of communications traffic. It will be seen that, in the example of FIG. 3, each of the end stations connected to ports B to E is involved in one multicast communication or another. Therefore each of these end stations will have been designed to cope with the high volume of communications traffic generated. However, the present invention permits the attachment of other types of end station which may not be designed to deal with such a large volume of traffic. In example shown in FIG. 3 it may be that such an end station is attached to port A and, according to the operation of this invention, the multicast communications designated by addresses M1, M2 and M3 are not transmitted on port A and are therefore never received by the end station attached to this port. However, because of the entry in the default bit mask the end station attached to port A will receive all other communications in the normal way. The end station attached to port A therefore is not required to be designed with increased processing power simply because it may be attached to a network on which high volume multicast communications may be occurring.

Clearly, other bit mask entries may be included in the address table 144 corresponding to other multicast addresses. Also, it may be possible to incorporate bit masks for unicast communications in the address table 144 such that a received communications packet is retransmitted uncorrupted only on the one port which is necessary for it to reach its intended destination.

As mentioned above, the description of this invention being implemented by way of bit masks as illustrated in FIG. 3 is merely by way of example and other implementations may be envisaged. Also, it is of course not limiting that the repeaters 14 illustrated in the described embodiments include only five ports each connected directly to MAC devices and end stations. The repeater according to the present invention can usefully be incorporated in larger networks where it will provide similar advantages in terms of the necessary processing power at the various end stations.

What is claimed is:

1. A repeater for use in a computer network for providing communication between a plurality of network devices connected to the repeater, in which network communication is conducted by way of data frames of preset format, the repeater comprising:

a plurality of ports to which network devices may be connected;

means for receiving incoming unicast data frames and multicast data frames to any one of said ports and for retransmitting them via at least one of the other ports during a time interval that before the respective data frame has been completely received, each said unicast data frame including a single identification of its intended destination and each multicast data frame including a group identification of network devices in the network;

means for storing information which for each of a plurality of group identifications, denotes a corresponding subset of said ports to each of which a network device in said group is connected;

means for reading at least a portion of a received data frame and determining whether that frame has one of said plurality of group identifications; and means responsive to said information for corrupting the frame in retransmission via ports other than those in said corresponding subset.

2. A repeater according to claim 1 in which said means for corrupting comprises means for generating one of random, predefined cyclic and constant data and means for substituting said data into at least a portion of a data frame.

3. A repeater according to claim 1 in which said means for corrupting comprises means for corrupting an error check portion of a data frame.

4. A repeater according to claim 1, wherein said means for storing comprises an address table having entries each denoting a respective bit mask for a respective group identification, the bits in each bit mask denoting respective ones of said ports.

* * * * *